June 2, 1953          F. B. WELLS          2,640,278
TANGENTIAL AND ROTATIONAL MOTION INDICATING DEVICE
Filed Nov. 16, 1949          4 Sheets-Sheet 1
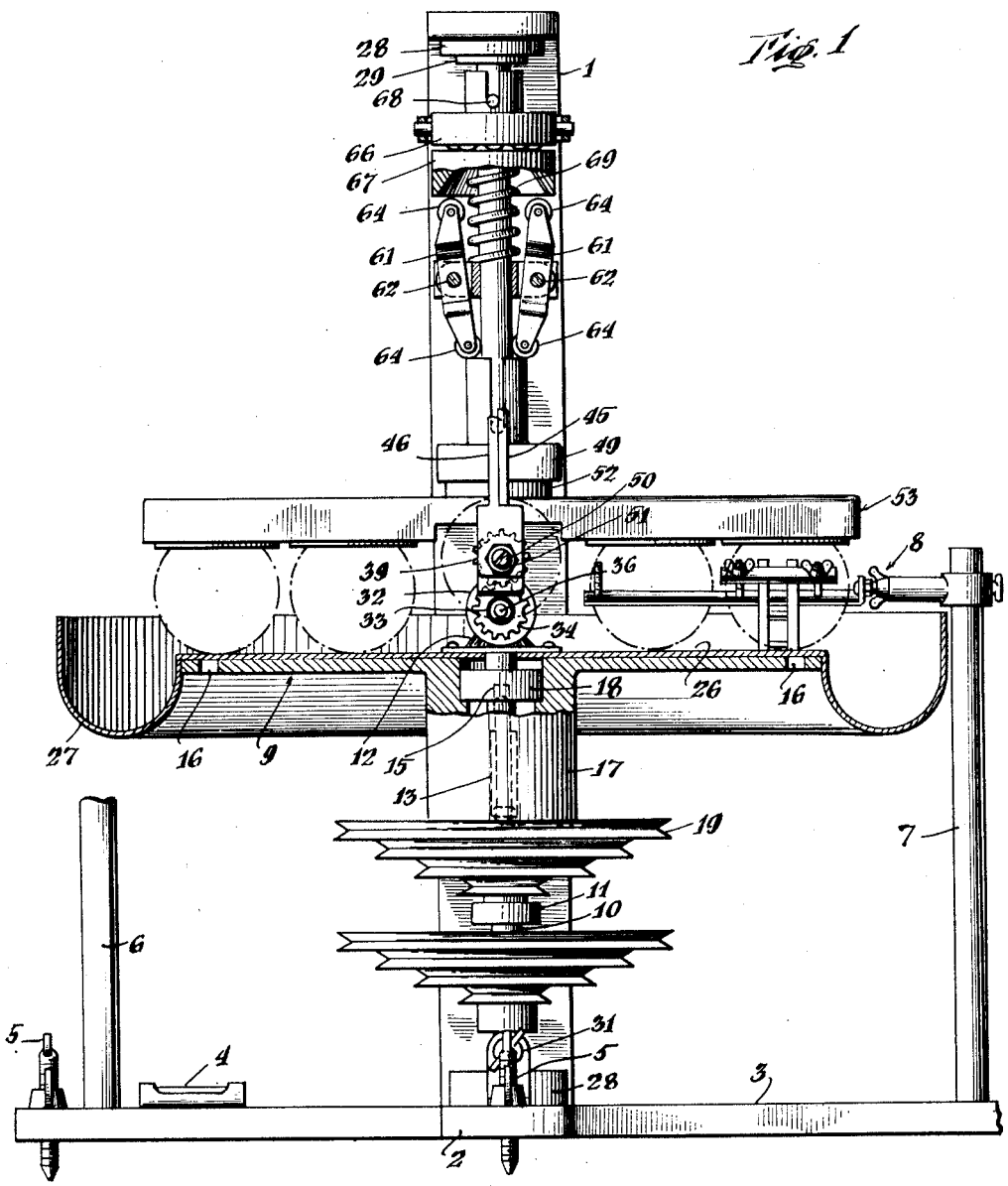
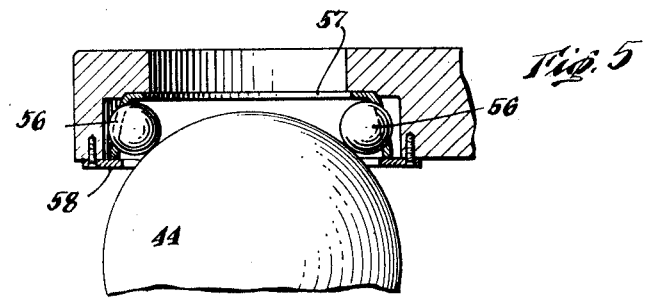
INVENTOR.
Franklin B. Wells
BY Frank B. Root
AGENT June 2, 1953      F. B. WELLS      2,640,278
TANGENTIAL AND ROTATIONAL MOTION INDICATING DEVICE
Filed Nov. 16, 1949      4 Sheets-Sheet 2
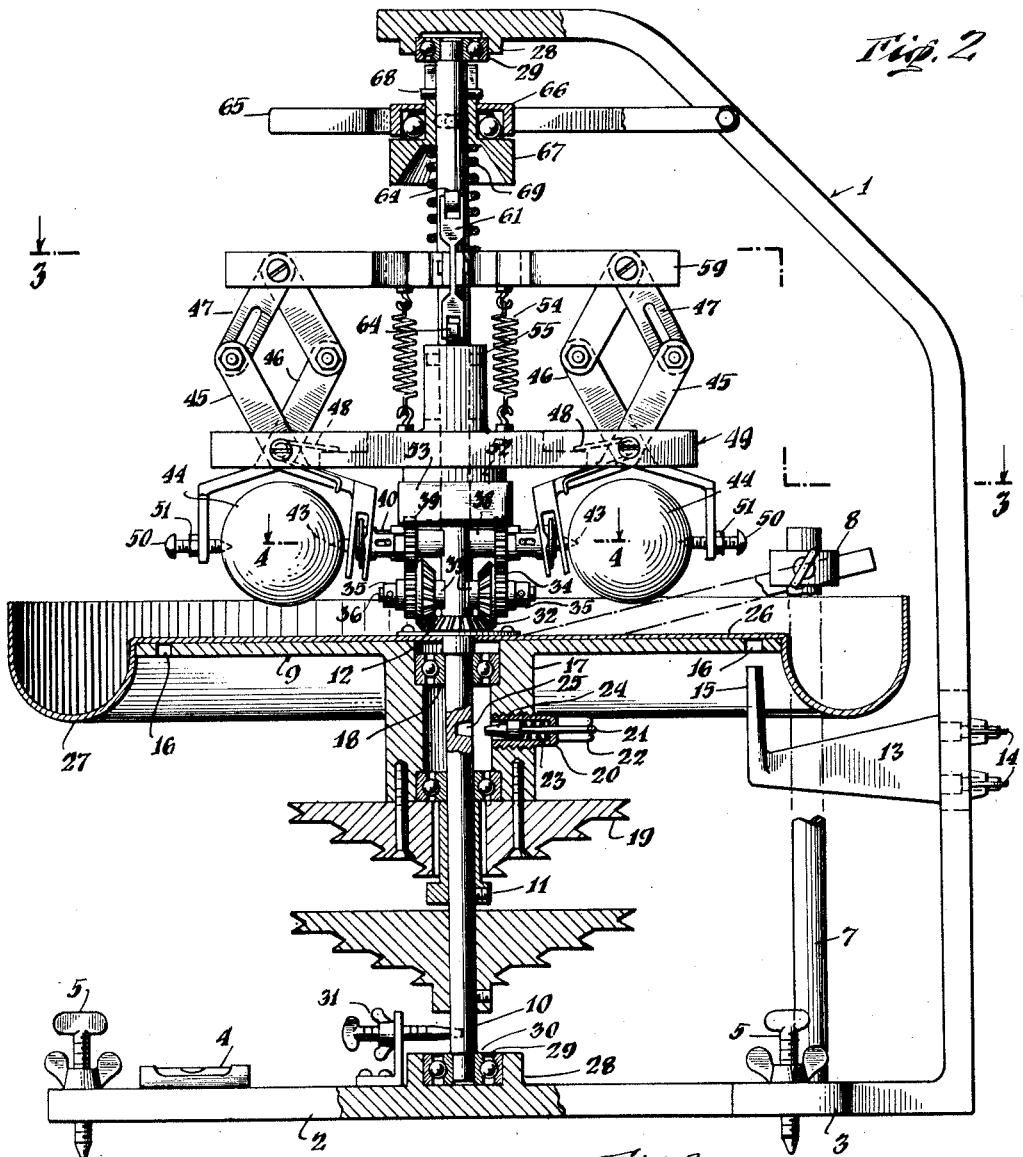
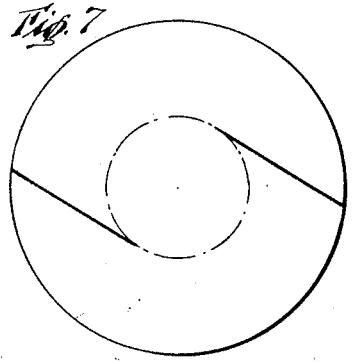
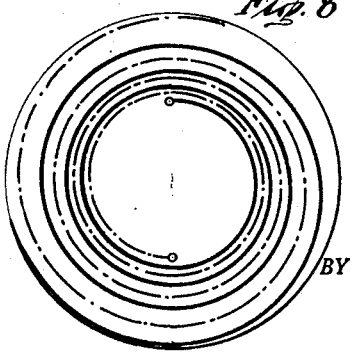
INVENTOR.
Franklin B. Wells
BY Frank B. Root
AGENT

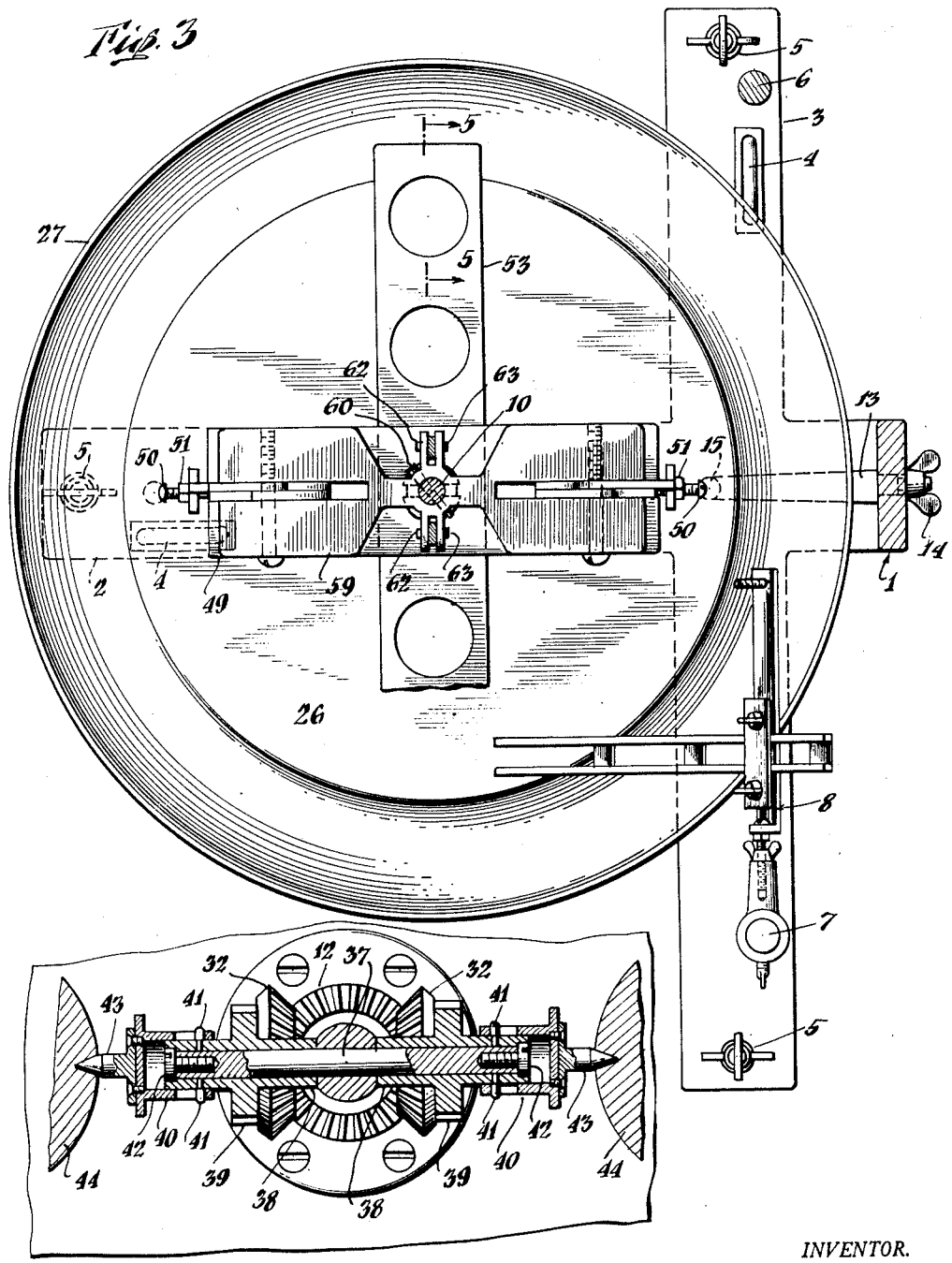

June 2, 1953  F. B. WELLS  2,640,278
TANGENTIAL AND ROTATIONAL MOTION INDICATING DEVICE
Filed Nov. 16, 1949  4 Sheets-Sheet 4

INVENTOR.
Franklin B. Wells
BY Frank B. Root
AGENT

Patented June 2, 1953

2,640,278

UNITED STATES PATENT OFFICE 2,640,278

TANGENTIAL AND ROTATIONAL MOTION INDICATING DEVICE

Franklin B. Wells, Montclair, N. J., assignor of one-half to Ellis-Foster Company, Montclair, N. J., a corporation of New Jersey Application November 16, 1949, Serial No. 127,698

5 Claims. (Cl. 35—19)

This invention relates to apparatus which illustrates graphically the path followed by a freely moving mass when it is influenced by circular or rotational motion under varying conditions. The device consists of a suitable framework upon which are mounted two major and one minor functional assemblies, and a motive power assembly to impart rotational motion to either one or both of the major functional assemblies.

Broadly considered, the first major functional assembly comprises a horizontal rotatable disc having on its upper surface pressure sensitive means for indicating thereon the path of masses in the form of metal balls during motion of either the disc or the balls or during differential motion of both. The second major functional assembly is rotatable upon the same axis as the first and comprises means for holding and imparting motion to the balls and releasing them upon the above mentioned disc. The minor functional assembly is also means for releasing balls at any point of the disc but in rolling motion and during rotation of the disc. In the drawings:

Fig. 1 is a general view in front elevation showing one form of the invention.

Fig. 2 is a side elevation of the same form of the invention as Fig. 1.

Fig. 3 is a section taken on line 3—3 of Fig. 2.

Fig. 4 is a section taken on line 4—4 of Fig. 2.

Fig. 5 is a section taken on line 5—5 of Fig. 3.

Figs. 7 and 8 are diagrams showing tracings of the path of balls when released under varying conditions of differential motion, Fig. 7 being a simple tangential path and Fig. 8 being a form of Archimedes spiral.

Figure 6:
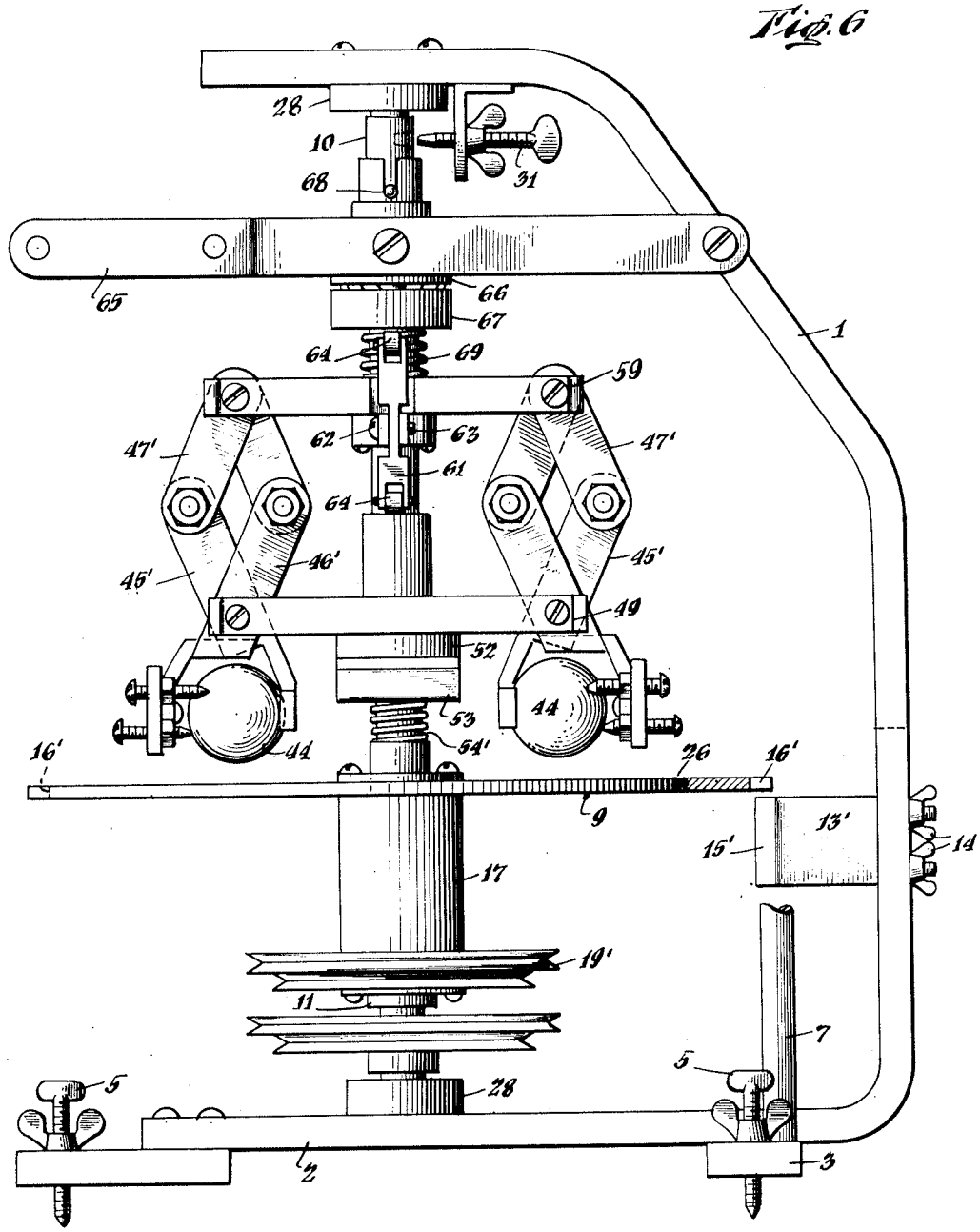
Fig. 6 is a side elevation of another form of the invention.

In the drawings the entire frame is designated by the numbers 1, 2 and 3 which represent, respectively, an upright support 1 forwardly directed at its upper end, and the base comprising a horizontal arm 2 projecting forward from the lower end of the support and a cross-arm 3 welded to the horizontal arm and extending, say, 12" from both sides thereof. Two levels 4 are at right angles to each other and each is placed near the end of the base member to which it is attached so that they may be read easily. A thumb-screw levelling device 5 with wing-nut locks is situated at the end of each base member. A rod or post 6 (suitably of ½" soft steel) is screwed into one outer end of the base cross-arm for the support of the motive power assembly (not shown). A similar rod or post 7 is attached to the other end of the base cross-arm for support of the minor functional assembly 8 (described later). Lock nuts (not shown) are used to secure these rods to the base cross-arm and prevent turning thereof during operation.

The first of the major functional assemblies (hereinafter known as the plate assembly) comprises a horizontal circular plate 9 freely rotatable on a shaft 10 which extends from a central part of the base above described to the upper end of the upright support 1. In the drawings it consists of all those parts between and including the bearing retaining bushing 11 and the bevelled ring gear 12. The plate assembly may be locked in a stationary position whenever desired by means of the plate assembly lock 13. When the two wing nuts 14 are loosened, the lock 13 may be moved upwards until the tapered prong 15 engages one of the tapered holes or slots 16 in the plate 9. On tightening the two wing nuts 14, the plate assembly is locked rigidly in place. The studs upon which the wing nuts are placed pass through a vertical slot in support 1 and guide the lock 13 in a straight line when it is moved up or down. The bearing-retaining bushing 11 is locked by means of a set screw to shaft 10 and this prevents the plate assembly from sliding downward on the shaft. A soft steel tube or sleeve 17 of at least ½"-wall thickness encircles the vertical shaft below the plate. It serves as a retainer for the outer races of the bearings 18 which allow the plate assembly to rotate freely upon the shaft 10, and has fastened on its lower face the pulley block 19 for driving the assembly, and on its upper face the plate 9 and bevelled ring gear 12. Into the side of sleeve 17 is screwed lock 20, which serves to lock the plate assembly to shaft 10. In Fig. 2 this lock is shown in the disengaged position. The bent end of handle 21 as shown is turned away from the observer and resting in a notch of the lug 22. When the handle is pulled out slightly and turned at least 90° and then released, the compression spring 23 forces the tapered plug 24 at the end of the handle inward until it engages the tapered hole 25 in shaft 10. As thus locked the plate assembly moves as a unit with the other parts of the apparatus which are fastened to the shaft.

The plate 9 is suitably a flat steel disc about $\frac{3}{16}''$ in thickness and 12'' in diameter. On the upper surface of the plate is placed the graphic tracing device 26 which may be any pressure sensitive graphic recording means responsive to pressure directed on its surface by a moving point of pressure (as represented by a rolling ball). A ball rolling on the surface of the tracing device records its path visually. For example, the recording device may be carbon paper on top of a blank sheet of paper, preferably with a circular tough, transparent, flexible sheet over the carbon paper for protection thereof. Another form of graphic tracing device also preferably consists of three parts. The lower element is a circular sheet resting on the plate and having a dark and tacky upper surface. The second element which rests upon the first is a circular thin transparent pliable plastic sheet. Its under surface is etched so that it appears white. Slight pressure causes the etched surface to adhere to the tacky surface below it and, wherever adhesion occurs, the white color of the etched surface changes to a dark mark. Thus, a ball rolled across the device leaves a dark trace. When the second element is pulled away from the first the mark or trace disappears and a white surface is again presented. The third element is a thin, circular, transparent, pliable, tough, plastic sheet which is placed upon the second element to protect it from wear. The outer edges of the second and third element may be cemented together if desired.

The plate 9 is surrounded by a circular thin metal gutter 27 whose inner edge bends in and extends a short way (say, $\frac{1}{2}''$) over the outer edge of the plate. The outer edge of the tracing device is cemented to the bottom of the inner edge of the gutter. The gutter serves three purposes. It catches the released balls, it prevents wrinkles in the tracing device, and it lifts so that traces can be removed easily. Four equally spaced bolts or pins (not shown) may be advantageously fitted into vertical slots in the inner side of the gutter and fastened to holes in the outer edge of the plate. They serve to guide the gutter in a straight line as it is lifted and prevent lifting the gutter so high as to tear the tracing device.

The second major functional assembly is a ball-holding and ball-release assembly and consists of all moving parts on shaft 10 not described in the plate assembly. It comprises ball rotational drive means associated with cross-arms 49, ball rolling means associated with cross-arms 53 (the cross-arms 49 and 53 being at right angles to each other), and ball release means associated with cross-arms 59 which are located over the other cross-arms and parallel to one pair thereof (preferably parallel to the cross-arms 49). The ball rotational drive means permits balls to be given a revolving motion in either direction at varying speeds relative to the disc 9 and out of contact therewith and dropped thereupon. The ball rolling means permits the balls to roll in contact with the moving disc 9. The ball release means frees the balls at the time desired.

Shaft 10 suitably consists of a $\frac{5}{8}''$ soft steel axle. Bearing housings 28 and standard ball bearings 29 are at the top and bottom of the shaft to permit free and even rotation. Desirably a thin metal dust guard 30 for the lower bearing 29 is fastened to the upper edge of the lower bearing housing 28. A release assembly lock 31 which consists of a bracket bolted to base 2 and a thumbscrew with a tapered end which passes through the bracket and is locked to it by a wing nut is provided. In use the tapered end of the thumbscrew is seated in a tapered hole in shaft 10, thus locking the release assembly rigidly.

The ball rotational drive assembly, some of the detail of which is shown in Fig. 4, comprises all the parts from and including gears 32 to and including ball clutch pieces 43. It is driven by the bevelled ring gear 12 which turns the bevelled gears 32 mounted on hollow shafts 33. Also mounted on the hollow shafts 33 are ordinary gears 34. The hollow shafts are, in turn, mounted upon a small (about $\frac{1}{4}''$) shaft 36 and are held thereon by set screw collars 35. The shaft 36 passes through the main shaft 10 and is held in place by a tapered pin driven through both shafts. Shaft 10 is flattened on both sides where shaft 36 passes through it, so that the inner ends of hollow shafts 33 have a flat surface to turn against. The ordinary gears 34 are placed far enough away from the bevelled gears 32 so that when the collars 35 are loosened the hollow shafts 33 may be moved outward far enough so that the bevelled gears 32 no longer engage the bevelled ring gear 12. In this position the balls 44 are given no rotational motion about their horizontal axis. Not shown in the drawings are means to prevent the collars 35 from slipping off of the shaft 36 (e. g., screw heads). During operation centrifugal force keeps the hollow shafts 33 from returning to such a position that the gears 32 may re-engage the bevelled ring gear 12.

Another parallel shaft 37 (more clearly shown in Fig. 4) is mounted above shaft 36 in a manner similar to the mounting of shaft 36 and at a height so that the ordinary gears 39, which are mounted on the hollow shafts 38, properly engage the gears 34. The hollow shafts 38 are held in place by the retaining screws 42. The clutch-holding pieces 40 are free to move backward and forward on the hollow shafts 38 but are forced to turn with these same shafts by means of a slide joint. Figs. 2 and 4 show the essential details of this slide joint. The clutch-holding pieces 40 are prevented from sliding off the hollow shafts 38 during disassembly for adjustments, etc., by the small guide screws 41 which pass through slots in the sides of the rotating pieces 40. Two fiber clutch pieces 43 attached to the holding pieces 40 have their outer ends conically tapered to fit snugly into holes with the same conical taper which are drilled into the balls 44. A good clutching surface is thus provided to cause the balls to rotate when the fiber clutch pieces 43 rotate. Each ball is provided with a second hole of the same taper at the opposite side. This second hole provides a place for a point bearing so that the balls may be caused to rotate about a horizontal major axis during operation. The ratio of the gear teeth of the bevelled ring gear 12 and the gear teeth of the ball rotational drive assembly is such that, when the plate assembly is locked in place and the release assembly given one complete revolution about the center of rotation of the shaft 10 with the ball rotational drive assembly in operating position, any point on the major circumference of rotation of the balls will travel a distance which is linearly equal to that distance travelled by the center of the balls in completing one revolution about the shaft 10. Thus, if the balls are centered 3" from the center of rotation of shaft 10, and are 1½" in diameter, the gear ratio is such that the balls make two complete rotations about their major axes of rotation during each complete revolution about the center of rotation of shaft 10. The gears 34 and 39 can be replaced by a series of gears of differing ratios, if desired, so that the speed of axial rotation with respect to the speed of revolution of the balls may be varied. However, since the balls tend to follow tangential paths on release, much of the effect of using gears of different ratios may be realized by revolving the plate assembly and release assembly at different ratios. Use of the inclined track assembly 8 adds to this use of the device.

Ball rolling means consists of the cross-arm member 53 which is provided with two sets of large holes opposite to one another. These holes are fitted with ball bearings as shown in Fig. 5, where 56 represents two of the ball bearings, 57 represents the ball bearing retaining ring, and 58 a thin metal ring which holds the retainer ring in place. When the balls are in place under these holes in cross-arm 53, rotation of either the plate or the release assembly causes the balls 44 to roll over the tracing device 26 and trace a circle thereon. Under these conditions the balls are said to be rotating in a direction opposite to the direction of revolution of the plate assembly relative to the direction of revolution of the release assembly.

In the ball release means which is associated with crossarm 59, links 45 have prongs on the lower end and are so constructed that upon release they can move from the position shown in Fig. 2 only to such a position that the lower prongs, which fit over the outer rim of the clutch holding pieces 40, are absolutely vertical. Further motion of link 45 is prevented by a shoulder cut into cross-arm 49 for that purpose. It is quickly snapped to this position, upon release, by the spring 48. In operating position the inner rim of clutch holding piece 40 turns against the projections at the center of the inner prongs of link 45. At full release the bottoms of the prongs of link 45 should be at the height of the rotational axis of hollow shaft 38.

Release assembly link 46 has a prong directed downwards from its lower end and provided with a set screw 50 locked in place by the nut 51. The end of set screw 50 is provided with a hardened conical tip which fits into the outer conical hole in the ball 44. Since the taper of the hardened tip of the set screw is slightly steeper than the taper of the hole in 44 into which it fits, a point bearing is provided for the rotation of the balls.

Sleeve 52 passes up through a hole at the center of cross-arm 49 and cross-arms 49 and 53 are bolted thereto so that cross-arms 49 and 53 are at right angles. These three members form a unit which may move upward under the influence of tension springs 54 when released. Upward movement is guided in a straight line by vertical grooves cut into the upper part of the inner surface of sleeve 52 which slide over guide screws 55 set in the central shaft 10. On release, the action of the lazy tongs device of which link 46 is also a part, raises the prong of link 46 above a point of possible interference with the balls rolling on the graphic tracing device 26.

Release cross-arm 59 is held in position on shaft 10 by means of the tapered pin 60. In addition to providing an upper pivot for the lazy tong release devices, the cross-arm 59 also provides a pivot for the release assembly members 61 by means of the pivot bolts 62 which are locked in place by nuts 63. The release members 61 are equipped with rollers 64 at both upper and lower ends. The upper part of release members 61 is somewhat heavier than the lower part so that centrifugal force keeps them in the operating position shown in Fig. 1.

Details of the actual trigger release means are as follows. The handle 65 is pivoted to the frame and also to the sides of the circular bearing retaining member 66 which does not rotate and which is separated from the rotating sleeve 67 by a ball bearing. Sleeve 67 turns with shaft 10. It is held in the position shown in the drawings by the compression spring 69. Sleeve 67 moves up and down on shaft 10 and is guided in this movement by the guide screw 68 which projects from each side of shaft 10 into slots cut into the upper part of sleeve 67. When the handle 65 is pressed downward, member 66 is forced down, the pressure being transferred through the bearing to sleeve 67 which moves downward. Its inner conical surface contacts the upper rollers 64 forcing the upper ends of release assembly members 61 inward while the lower ends move outward until the lower rollers 64 pass the upper edge of sleeve 52. The united members 49, 52 and 53 are then snapped upward by the action of the tension springs 54. This upward motion is stopped by a rubber washer (not shown) around shaft 10 and just below crossarm 59. Release of the balls 44 from any of the holders is thus effected.

The motive power assembly which is mounted on rod 6 consists of an electric motor (e. g., a $\frac{1}{25}$ H. P. 1800 R. P. M. motor, either A. C. or D. C.). The end of the motor shaft is fitted with a worm which engages a 30-tooth gear on a vertical shaft. The shaft thus rotates at 1 R. P. S. and is fitted, at its lower end, with two pulley blocks. Any desired ratio of pulleys may be used on these two blocks as well as on the pulley blocks driving the plate and release assemblies. However, the blocks used here are all exactly the same size with pulley ratios of 1, 2, 3 and 4. The upper block of the motive power assembly drives the plate mechanism and the lower one drives the release mechanism. Coil spring belts are used as many different drive combinations in the same or reverse directions can be used without shifting the pulley blocks. The only disadvantage of such belts, which is more than overbalanced by the advantages, is the whip developed due to starting inertia so that the device must be allowed to run for about 15 seconds in order that equilibrium may be reached before release of the balls is effected. As the pulley blocks on the drive shaft turn at 1 R. P. S., and as all the pulley blocks have pulleys in a 1, 2, 3, 4 ratio, by use of the proper pulleys, either the release assembly or the plate assembly or both can be caused to revolve at from ¼ R. P. S. to 4 R. P. S. When both assemblies are revolving in opposite directions, their relative speeds may be varied from ½ R. P. S. to 8 R. P. S.

When the balls are held in the inner holders of ball-rolling member 53, which is revolving while the plate assembly is locked, they trace a circle and on release two tangent traces are obtained giving a perfect graphic illustration of tangential motion. This typical type of trace is shown in Fig. 7. The same thing is illustrated under the same conditions when the outer holders of ball-rolling member 53 are used. However, the balls are nearer the edge of the plate so that the tangent traces are shorter. When the balls are held in these same two outer holders of ball-rolling member 53, the release assembly locked and the plate assembly revolved, on release they first trace paths which curve inward toward the center before they begin to move outward, thus graphically illustrating the effect of rotational inertia of the balls.

These latter examples illustrate the path followed on the plate when the balls 44 have no forward velocity but have a rotation opposite to that of the plate.

When the balls are held in either of the two opposite sets of holders of member 53 or in the mechanism associated with cross-arm 49 (that is, between the prongs of links 45 and 46), release assembly and plate assembly locked together by the locks 20 and the two assemblies then rotated together as a unit, the balls, upon release, trace a path on the tracing device 26 which appears to start outward along a line drawn through the centers of the balls bisecting the plate and then curves either right or left depending upon the direction of the plate and release assembly rotation.

When the balls are held in the release assembly members associated with cross-arm 49, with the ball rotational drive mechanism either engaged or not engaged, the plate assembly locked and the release assembly rotated, the balls trace tangential paths, upon release, but since the balls do not touch the plate assembly until release, these tangents are less striking than those described above with the use of member 53 since no circle is here traced. When the balls are held in the release assembly associated with cross-arm 49 with the ball rotational drive mechanism not engaged, the release assembly locked and the plate assembly rotated, the balls, upon release, trace modified Archimedes spirals. This typical trace is shown in Fig. 8.

With these examples in mind, it can be readily seen that many variations may be accomplished when using the release members 45 and 46 with the ball rotational drive assembly either engaged or not engaged by rotation of the plate assembly and release assembly in the same or opposite directions at different speeds. By rolling the balls down the track of the minor functional assembly 8 while the plate rotates in either direction, further variations are obtained in the path followed on the plate.

Calculation of the mathematical formulae for the traces obtained presents interesting problems for students of mathematics, physics, and mechanics. An especially interesting case is the formula for the modified (Archimedes) spiral obtained upon release when the balls are held in the members 45 and 46, the release assembly locked, the plate assembly rotated, and the drive mechanism disengaged.

Types of drive and release mechanisms other than those described may be used without departing from the spirit of this invention. Thus, magnetic, electric, and electronic release mechanisms could be used. The motor and worm-gear reduction unit may be omitted and in its place a slow speed high torque motor or a fly wheel type crank substituted, the shaft of either of which would then turn the two driving pulley blocks. A gear shift mechanism for obtaining differing speeds of plate assembly and release assembly has already been rejected in favor of the more mechanically simple pulley block drive.

Simpler machines embodying one or more of the features herein presented may be used without departing from the spirit of this invention. Fig. 6 shows one such simpler device which has been constructed, wherein the numerals designate corresponding parts. Wherever the parts are modified, the numbers are primed. Plate assembly lock 13 has a tapered end 15$^1$ which fits into slots 16$^1$ in the edge of plate 9. In this modification, there is no plate assembly-release assembly lock 20. In its place two set screws (not shown) are set into opposite sides of the plate assembly sleeve 17. When these are screwed in, the two assemblies are locked together. The release assembly lock 31 is placed at the top of this modification. The links 45$^1$ are hollowed at the lower ends. The balls fit into the hollows and are held firmly in place. The links 46$^1$ are supplied with three set screws to hold the balls in place. Links 47$^1$ do not have slots in them. A compression spring 54$^1$ replaces the tension springs 54 of Fig. 2.

I claim:

1. Apparatus for demonstrating tangential and rotational motion comprising, in combination, an upright supporting frame, a base, a driven vertical shaft extending from the top of the frame to the base, a horizontal flat disc on said shaft, graphic recording means sensitive to the pressure of a freely rolling ball and placed on top of said disc, horizontal ball-holding arms positioned above said disc, balls revolvably retained by said arms, and trigger means for releasing said balls during differential motion of disc and arms, whereby a graphic path of said balls when released is traced on said graphic recording means.

2. Apparatus for demonstrating tangential and rotational motion comprising, in combination, an upright supporting frame, a base, a driven vertical shaft extending from the top of the frame to the base, a driven horizontal flat disc freely rotatable on said shaft, graphic recording means sensitive to the pressure of a freely rolling ball and placed on top of said disc, horizontal ball-holding arms adjustably positioned above the disc and rotatable with said shaft, balls revolvably retained by said arms, and trigger means for releasing said balls during differential rotation of arms and disc.

3. Apparatus for demonstrating tangential and rotational motion comprising, in combination, an upright supporting frame, a base, a driven vertical shaft extending from the top of the frame to the base, a fixed horizontal flat disc on said shaft, graphic recording means sensitive to the pressure of a freely rolling ball and placed on top of said disc, horizontal ball-holding arms positioned above the disc and rotatable with said shaft, balls retained near the outer ends of said arms and in contact with the disc surface, and trigger means for releasing said balls during the rotation of said arms, whereby a graphic path of said balls when released is traced.

4. Apparatus for demonstrating tangential and rotational motion comprising, in combination, an upright supporting frame, a base, a vertical shaft extending from the top of the frame to the base, a driven horizontal flat disc on said shaft, graphic recording means sensitive to the pressure of a freely rolling ball and placed on top of said disc, fixed horizontal ball-holding arms positioned above said disc, balls retained by said arms, and trigger means for releasing said balls upon the pressure-sensitive graphic recording means during motion of disc.

5. Apparatus for demonstrating tangential and rotational motion comprising, in combination, an upright supporting frame, a base, a driven vertical shaft extending from the top of the frame to the base, a driven horizontal flat disc on said shaft, graphic recording means sensitive to the pressure of a freely rolling ball and placed on top of said disc, balls retained above said disc, and means for releasing said balls during motion of said disc, whereby a graphic path of said balls when released is traced.

FRANKLIN B. WELLS.

References Cited in the file of this patent
UNITED STATES PATENTS

| Number | Name | Date |
|---|---|---|
| 1,235,260 | Tubesing | July 31, 1917 |
| 1,662,272 | Klopsteg | Mar. 13, 1928 |
| 1,681,460 | Bruhn | Aug. 21, 1928 |
| 1,692,713 | Weber | Nov. 20, 1928 |
| 1,829,311 | Tea | Oct. 27, 1931 |
| 1,889,921 | Jakosky | Dec. 6, 1932 |
| 2,156,289 | Hoy | May 2, 1939 |
| 2,402,395 | Hagner | June 18, 1946 |